United States Patent
Keng et al.

(10) Patent No.: US 9,441,955 B2
(45) Date of Patent: Sep. 13, 2016

(54) REAL-TIME MULTI-POINT DIFFRACTION-BASED IMAGING SYSTEM FOR STRAIN MEASUREMENT

(71) Applicant: NANYANG POLYTECHNIC, Singapore (SG)

(72) Inventors: Oh Tiong Keng, Singapore (SG); Koh Wing Onn, Singapore (SG); Zhu Hui, Singapore (SG)

(73) Assignee: NANYANG POLYTECHNIC, Singapore (SG)

(*) Notice: Subject to any disclaimer, the term of this patent is extended or adjusted under 35 U.S.C. 154(b) by 0 days.

(21) Appl. No.: 14/670,602

(22) Filed: Mar. 27, 2015

(65) Prior Publication Data
US 2015/0276386 A1    Oct. 1, 2015

(30) Foreign Application Priority Data
Mar. 27, 2014    (SG) ............................ 10201401046U

(51) Int. Cl.
*G01B 11/16*    (2006.01)
*G01L 1/24*    (2006.01)

(52) U.S. Cl.
CPC    *G01B 11/16* (2013.01); *G01L 1/24* (2013.01)

(58) Field of Classification Search
CPC    G02B 26/0841; G02B 26/001; G02B 26/02; G02B 26/0833; G02B 2006/12104; G02B 2006/12109; G02B 2006/12126; G02B 2006/12159; G02B 2006/12164; G02B 26/08; G02B 6/12007; G02B 6/122; G02B 6/1225
See application file for complete search history.

(56) References Cited

U.S. PATENT DOCUMENTS

| | | | |
|---|---|---|---|
| 4,969,106 A | 11/1990 | Vogel et al. | |
| 5,233,174 A | 8/1993 | Zmek | |
| 6,097,477 A | 8/2000 | Sarrafzadeh-Khoee | |
| 6,943,869 B2 | 9/2005 | Hubner et al. | |
| 7,477,362 B2 | 1/2009 | Asundi et al. | |
| 7,755,752 B1* | 7/2010 | Salnik | G01N 21/1717 356/237.2 |
| 8,191,433 B2 | 6/2012 | Tao et al. | |
| 2007/0070327 A1* | 3/2007 | Asundi | G01L 5/0047 356/32 |

FOREIGN PATENT DOCUMENTS

WO    2013134680 A1    9/2013

* cited by examiner

*Primary Examiner* — Michael P Stafira
(74) *Attorney, Agent, or Firm* — Banner & Witcoff, Ltd.

(57) ABSTRACT

This invention relates to a system and a method for measuring strain of a specimen on a strain measurement system having an image capturing device, a spatial light modulator, a first light source, a second light source and a beam switching controller. The system receives parameters from an input from a user and generates a lenslet pattern to be transmitted to the spatial light modulator. The system transmits a frequency and switching sequence to the beam switching controller to alternate the first and second light sources and activate the image capturing device to capture images. The system receives a first image captured by the image capturing device caused by a beam of the first light source and a second image captured by the image capturing device caused by a beam of the second light source. Based on the first and second images received, the system optimizes the image capturing device.

24 Claims, 14 Drawing Sheets

REAL-TIME MULTI-POINT DIFFRACTION-BASED IMAGING SYSTEM FOR STRAIN MEASUREMENT

CROSS REFERENCE TO RELATED APPLICATIONS

This application claims priority to Singaporean application no. 10201401046U, filed Mar. 27, 2014, the entire contents of which are incorporated herein by reference.

FIELD OF THE INVENTION

This invention relates to a strain measurement system. More particularly, this invention relates to a strain measurement system that provides real-time, full-field strain distribution measurement over a surface area as small as 0.5 mm by 0.5 mm with high sensitivity.

PRIOR ART

Strain measurement tools are used for measuring and analysing dynamic strain distribution over a material. Some of the tools for measuring dynamic strain distribution over a material include electrical resistance micro-strain gauge and optical-based Moire interferometry systems.

One example of an electrical resistance micro-strain gauge is the bonded metallic strain gauge. This gauge is able to provide high sensitivity and accuracy. However, this gauge is a point measurement device which gives a single strain value over the active area. Hence, it is unable to provide high-precision full-field measurement of strain distribution over small areas.

On optical-based Moire interferometry system, strain is determined by the number of fringes over a sample area on the image. This system produces fringe pattern based on two opposite and symmetric beams incident on the sample/specimen with grating. However, fringe processing and interpretation is complex, subjective and time-consuming. Also, this technique displays low resolution due to poor fringe contrast when there is an increase in fringe frequency or poor fringe sparsity. Although this technique provides full-field strain information, it suffers from low accuracy and sensitivity when measuring over small regions, as the number of fringes available will be reduced as well.

Hence, those skilled in the art are striving to provide an improved system that provides full-field strain information with high accuracy and sensitivity when measuring over small regions of a specimen.

SUMMARY OF THE INVENTION

The above and other problems are solved and an advance in the art is made by a strain measurement system in accordance with this invention. A first advantage of a strain measurement system in accordance with this invention is that the strain measurement system offers real-time study of strain measurement and distribution over a small surface area of any microelectronics devices when undergoing thermal or mechanical stress. A second advantage of a strain measurement system in accordance with this invention is that the strain measurement system is capable of two dimensional full-field strain measurement and analysis with micrometric sensitivity and accuracy. A third advantage of a strain measurement system in accordance with this invention is that the strain measurement system is able to automatically configure and create the desired lenslet pattern to meet application-specific measurement requirements, and achieves the optimized setting for the required strain sensitivity, range and distribution density. A fourth advantage of a strain measurement system in accordance with this invention is that the strain measurement system performs dynamic analysis of strain over space and time. The analytics is able to identify and highlight trends of potential or in-situ stress build-up and predict potential device failures, thus allowing new insights into structural design characteristics and performance of packages to be gained. A fifth advantage of a strain measurement system in accordance with this invention is that the strain measurement system is adaptive to varying reflectance and diffraction properties of the target measurement surface to allow a diverse range of devices with different packaging materials to be catered for. In brief, the strain measurement system provides an innovative solution for the microelectronic device designers and manufacturers from microelectronic industry.

In accordance with an aspect of the invention, a system and a method for measuring testing strain resistance of a specimen on a strain measurement system having an image capturing device, a spatial light modulator, a first light source, a second light source, a beam switching controller, and a processing system is provided in the following manner. The system receives parameters from a user and generates a lenslet pattern based on the parameters received. The lenslet pattern is then transmitted to the spatial light modulator. The system then transmits a frequency and switching sequence to the beam switching controller to alternate the first and second light sources and activate the image capturing device to capture image. Subsequently, the system receives a first image captured by the image capturing device caused by a beam of the first light source and a second image captured by the image capturing device caused by a beam of the second light source. The image capturing device is optimised based on the second and first images received. The second image and first image are displayed in response to the image capturing device being optimised. Concurrently, a signal is transmitted to the beam switching controller to temporary stop activating the first and second light sources and the image capturing device. The system then receives an input from the user to being stress measurement and in response, transmits a signal to the beam switching controller to continue alternating the first and second light sources and activating the image capturing device to capture image. The system receives a subsequent first image captured by the image capturing device caused by a beam of the first light source and a subsequent second image captured by the image capturing device caused by a beam of the second light source. The system then displays second image and first image to a display and repeats the step of receiving a subsequent first image and a subsequent second image and the step of displaying the second image and first image.

In accordance with an embodiment of this invention, the parameters from the user are strain resolution and strain measurement range. Further, the lenslet pattern is generated in the following manner. The system determines a lenslet focal length, f, a lenslet spacing, s, a radial coordinate. The system then generates the lenslet pattern based on the lenslet spacing and the radial coordinate. A gray-scale image based on the lenslet pattern is generated. In accordance an embodiment of this embodiment, the lenslet focal length, f, is determined in the following manner. The system retrieves an angle, $\beta$, between an incident direction of the first or second light source and a norm of the specimen surface, a wavelength, $\lambda$, of the first or second light source, and a pixel size of the image capturing device from a media of the processing system. The system then determines a grating pitch, P, with the following expression $$P = \frac{\lambda}{\sin\beta},$$

and subsequently the lenslet focal length, f, using said strain resolution, $\epsilon_{res}$, with the following expression, $$f = \frac{P}{2\lambda\epsilon_{res}} \times \text{pixel size}.$$

In accordance with an embodiment of this embodiment, the lenslet spacing, s, is determined in the following manner. The system retrieves an operating range of the spatial light modulator from the media. The system then compares the strain measurement range with the operating range. If the strain measurement range being lesser than or equal to the operating range, the lenslet spacing, s, is determined with the following expression, $$s = \frac{f\lambda}{p}.$$

If the strain measurement range is greater than the operating range, the lenslet spacing, s, is determined with the following expressions $$s > \text{required range} \times \frac{2f\lambda}{P}$$

and $$s = \frac{(2n+1)f\lambda}{n(n+1)p},$$

where n=1, 2, 3 . . . . In accordance with an embodiment of this embodiment, the radial coordinate is determined with the following expression, $\phi(r) \approx 2\pi(a_2 r^2)$ where $$a_2 = \frac{1}{2f\lambda}.$$

In accordance with an embodiment of this invention, the image capturing device is optimised based on said second and first images in the following manner. The system binarises the second and first images. Bright spots in the second and first images above a pre-defined pixel size are collated and sorted into an array of dots to form a matrix. The system determines the horizontal and vertical pitches of the matrix. The horizontal and vertical pitches are compared with the lenslet spacing. If one of the horizontal and vertical pitches is smaller than the lenslet spacing by a pre-defined threshold value, the system increases an exposure time of the image capturing device. If one of the horizontal and vertical pitches is greater than the lenslet spacing by the pre-defined threshold value, the system decreases the exposure time of the image capturing device. If each of the horizontal and vertical pitches is within the lenslet spacing by the pre-defined threshold value, the system stores a location of each of the bright spots as reference positions for each of the U and V field images in the media.

In accordance with an embodiment of this invention, the step of displaying the second image and first image is provided in the following manner. The system determines the location of each of the bright spots and computes a first normal strain value for each of the bright spots in the first image with the following expression, $$\epsilon_x = \frac{du}{dx} = \frac{\Delta x}{2f\sin\beta} = \frac{P}{2f\lambda}\Delta x,$$

where $\Delta x$ is the x displacement of the reference positions for each of the bright spots in the first image. Subsequently, the system computes a second normal strain value for each of the bright spots in the second image with the following expression, $$\epsilon_y = \frac{dv}{dy} = \frac{\Delta y}{2f\sin\beta} = \frac{P}{2f\lambda}\Delta y,$$

where $\Delta y$ is the y displacement of the reference positions for each of the bright spots in the second image. The system then computes a shear strain value for each of the bright spots with the following expression, $$\epsilon_{xy} = \frac{1}{2}(\Delta\theta_1 + \Delta\theta_2)$$

where $$\Delta\theta_1 = \frac{du}{dy} = \frac{\Delta y}{2f\sin\beta},$$

$$\Delta\theta_2 = \frac{dv}{dx} = \frac{\Delta x}{2f\sin\beta},$$

$\Delta x$ and $\Delta y$ are the x and y displacements of the reference positions for each of the bright spots in each of the first and second images, which represent the U and V field respectively. The first and second images are then displayed with the first normal strain value, second normal strain value and shear strain value for each of the bright spots.

BRIEF DESCRIPTION OF THE DRAWINGS

The above and other features and advantages in accordance with this invention are described in the following detailed description and are shown in the following drawings:

FIG. 11 illustrating an example of a result of a specimen after initializing process;

FIG. 12 illustrating an example of a result of the specimen during a stress measurement process.

DETAILED DESCRIPTION

This invention relates to a strain measurement system. More particularly, this invention relates to a strain measurement system that provides real-time, full-field strain distribution measurement over a surface area as small as 0.5 mm by 0.5 mm with high sensitivity.

Figure 1:
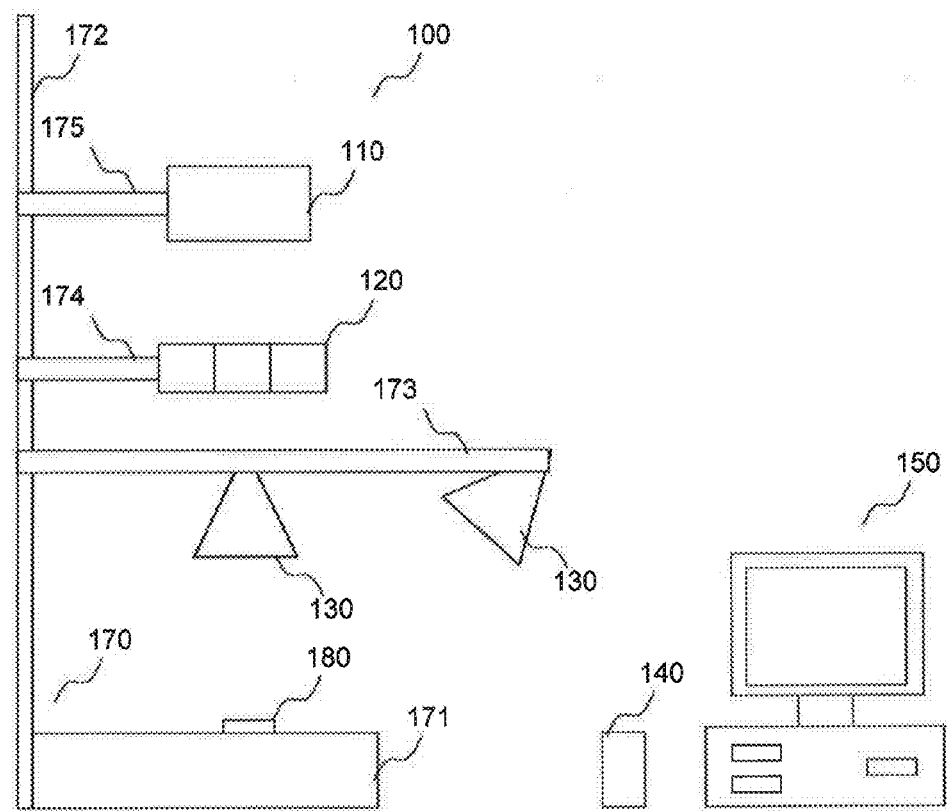
FIG. 1 illustrating a side view of an optic system in accordance with an embodiment of this invention.

The strain measurement system includes an application and an optical system. FIG. 1 shows a side view of an optical system 100. The optical system 100 includes an image capturing device 110, a spatial light modulator (SLM) 120, light sources 130, a beam switching controller 140 and a processing unit 150.

The image capturing device 110, spatial light modulator 120 and light sources 130 are arranged at various elevations by support structure 170. Support structure 170 includes a base 171, an upright 172 extending from the base 171, a first horizontal bar 173 for securing light source 130, a second horizontal bar 174 for securing spatial light modulator 120 and a third horizontal bar 175 for securing image capturing device 110. First, second and third horizontal bars 173-175 are movable along the upright 172 and are fastened onto the upright 172 at required elevation. A test specimen 180 is placed on a test bed provided on a top surface of the base 171. One skilled in the art will recognise that other support structure may be implemented without departing from the invention.

Image capturing device 110 is any typical device that is capable of capturing still and/or moving images such as a still camera or a video camera. Image capturing device 110 may be an industrial charged coupled device (CCD) sensor or complementary metal oxide semiconductor (CMOS) sensor. Preferably, the image capturing device has high sensitivity, and a sensor area of similar size as that of the SLM. Image capturing device 110 is communicatively connected to processing unit 150.

Spatial light modulator 120 is a device that varies the modulation of a beam of light. The use of spatial light modulator 120 is to generate microlens. Spatial light modulator 120 is communicatively connected to processing unit 150. Processing unit 150 generates lenslet pattern and transmits the lenslet pattern to spatial light modulator 120 to provide an array or microlenses according to the lenslet pattern. Further details of generating the lenslet pattern will be described below.

Light sources 130 are devices for providing light beams directed to a specimen 180. Preferably, light sources 130 are laser illuminators providing laser beam. The laser illuminators may be DPSS (diode-pumped solid-state) green lasers with wavelength of 532 nm as such laser illuminators are coherent and can be modulated efficiently by the SLM 120 for strain measurement. One skilled in the art will recognise that other wavelength may be implemented without departing from the invention. Although FIG. 1 shows only two light sources 130 are implemented, one skilled in the art will recognise that other number of light sources 130 may be implemented without departing from the invention as long as at least two light sources are used. Further details with regard to the arrangement of the light sources 130 will be described below.

Beam switching controller 140 is a typical control unit that controls the switching of the light sources 130. The beam switching controller 140 is communicatively connected to processing unit 150 and light sources 130. Beam switching controller 140 acts as an alternating relay or a timer for switching on either of the two light sources 130. It also provides a trigger signal to the image capturing device to synchronize the capture of the image.

Processing unit 150 is a computing system that executes instructions to perform the application system described below in accordance with this invention. Processing unit 150 is communicatively connected to image capturing device 110, spatial light modulator 120, and beam triggering beam switching controller 140.

Figure 2:
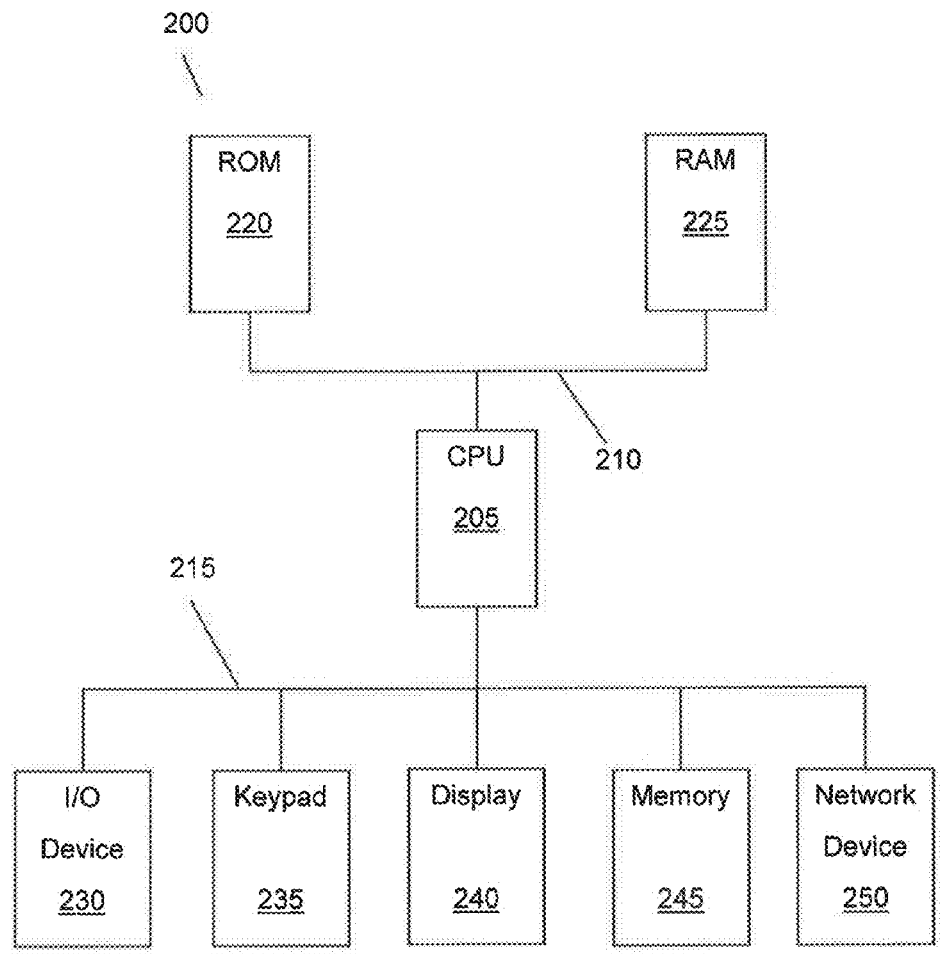
FIG. 2 illustrating a representative processing system in accordance with embodiments of this invention.

FIG. 2 illustrates exemplary processing system 200 that represents the processing unit that executes instructions to perform the processes described below in accordance with this invention. One skilled in the art will recognize that the instructions may be stored and/or performed as hardware, firmware, or software without departing from this invention. One skilled in the art will recognize that the exact configuration of each processing system may be different and the exact configuration executing processes in accordance with this invention may vary and processing system 200 shown in FIG. 2 is provided by way of example only.

Processing system 200 includes Central Processing Unit (CPU) 205. CPU 205 is a processor, microprocessor, or any combination of processors and microprocessors that execute instructions to perform the processes in accordance with the present invention. CPU 205 connects to memory bus 210 and Input/Output (I/O) bus 215. Memory bus 210 connects CPU 205 to memories 220 and 225 to transmit data and instructions between the memories and CPU 205. I/O bus 215 connects CPU 205 to peripheral devices to transmit and receive data between CPU 205 and the peripheral devices. One skilled in the art will recognize that I/O bus 215 and memory bus 210 may be combined into one bus or subdivided into many other busses and the exact configuration is left to those skilled in the art.

A non-volatile memory 220, such as a Read Only Memory (ROM), is connected to memory bus 210. Non-volatile memory 220 stores instructions and data needed to operate various sub-systems of processing system 200 and to boot the system at start-up. One skilled in the art will recognize that any number of types of memory may be used to perform this function.

A volatile memory 225, such as Random Access Memory (RAM), is also connected to memory bus 210. Volatile memory 225 stores the instructions and data needed by CPU 205 to perform software instructions for processes such as the processes for providing a system in accordance with this invention. One skilled in the art will recognize that any number of types of memory may be used to provide volatile memory and the exact type used is left as a design choice to those skilled in the art.

I/O device 230, keyboard 235, display 240, memory 245, network device 250 and any number of other peripheral devices connect to I/O bus 215 to exchange data with CPU 205 for use in applications being executed by CPU 205. I/O device 230 is any devices such as image capturing device 110, SLM 120, and bean switching controller 140 that transmits and/or receives data from CPU 205. Keyboard 235 is a specific type of I/O that receives user input and transmits the input to CPU 205. Display 240 receives display data from CPU 205 and display images on a screen for a user to see. Memory 245 is a device that transmits and receives data to and from CPU 205 for storing data to a media. Network device 250 connects CPU 205 to a network for transmission of data to and from other processing systems.

Figure 3A:
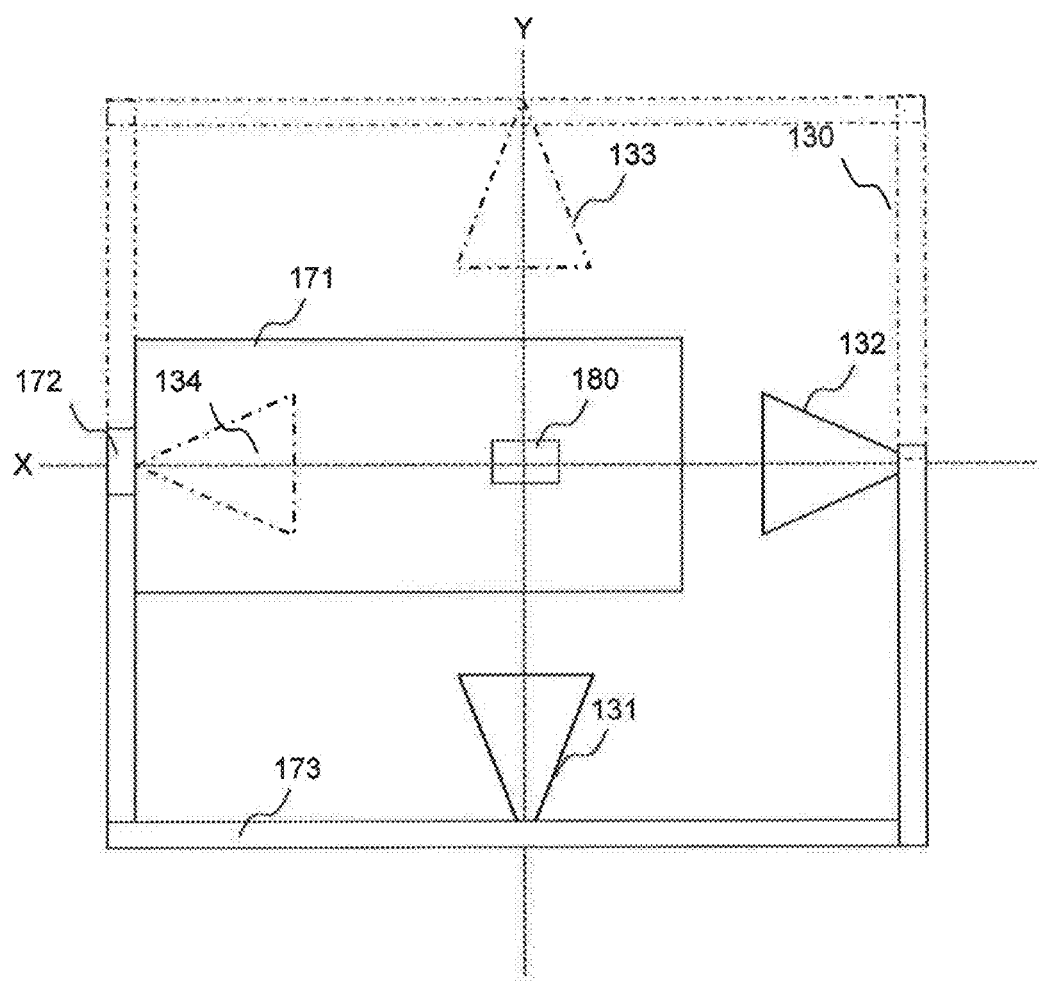
FIG. 3*a* illustrating a top view of the arrangement of the light sources in accordance with an embodiment of this invention.

FIG. 3 shows a top view of the light sources of the optical system 100. As shown, two light sources 130 are provided in accordance with an embodiment of this invention. In particular, a first light source 131 is arranged along a Y axis and a second light source 132 is arranged along an X axis. Optionally, a pair of light sources 131 and 133 may be provided along the Y axis and a pair of light sources 132 and 134 may be provided along the X axis without departing from the invention. Generally, the two laser illuminators are arranged perpendicularly to one another or 90 degrees apart from each other with respect to the test specimen 180 in order to measure the U field and V field of strain separately without overlapping with each other.

Figure 3B:
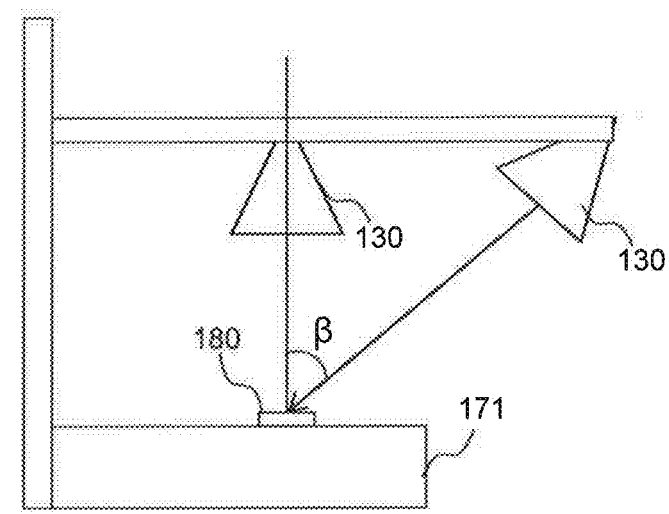
FIG. 3*b* illustrating a side view of a portion of the arrangement of the light sources in accordance with an embodiment of this invention.

FIG. 3b shows a side view of a portion of the optical system 100. The angle between the incident direction of the laser beam and the norm of the specimen surface, β is determined by the diffraction equation:

$$P \sin \beta = \lambda$$

where P is the pitch of the grating, λ is the wavelength of the laser source.

Figure 4:
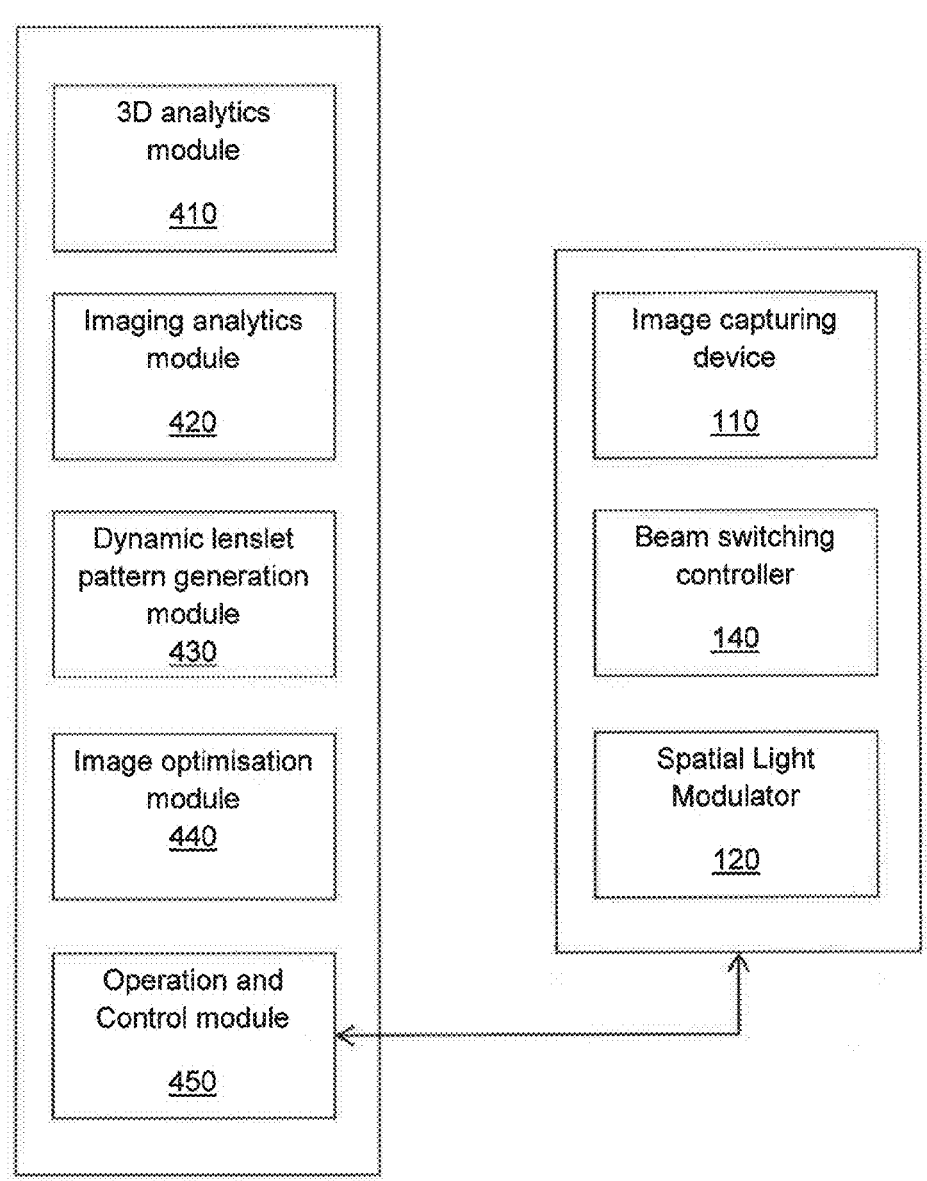
FIG. 4 illustrating the modules in the application system in accordance with an embodiment of this invention.

FIG. 4 illustrates the application system for controlling and receiving information from the optical system. The application system includes various processing modules. The application system has instructions stored in processing unit 150 for performing the processes in accordance with this invention. The application system includes the following modules: a 3 dimensional analytics module 410, an imaging analytics module 420, a dynamic lenslet pattern generation module 430, an image optimisation module 440, and an operation and control module 450.

3 Dimensional Analytics Module

Full field strain data will be most useful if it can provide dynamic analysis of the strain observed on the sample. This module allows a user to view the strain data in multiple ways, such as 3D distribution, contour map, 2D profile as well as strain progression over time. Trends of stress build-up over the measurement area will be identified and highlighted by the system to the user for speedy prediction of possible or potential damages and failures. This gives new insights into the structural design characteristics and performance of packages which significantly improve the efficiency of current industry practices.

Once the strain measurements are done, the strain value is associated with pixel coordinate (i, j) from the spot image. If the camera pixel size is the same as the size of the specimen, the 3D results are presented as strain values with coordinates in metric units (x, y, strain). Otherwise, the dimension has to be calibrated according to the size of the specimen before presenting the result in 3D. Each strain value is associated with the SLM pixel coordinate (i, j) of the corresponding lenslet center, which projects back to a measurement point on the specimen.

Generally, the areas of interest are the high strain/stress points. The algorithm will monitor the maximas and trigger if they exceed certain user-defined threshold. Rate of change at each point may also be tracked if those could contribute to potential component failures.

Imaging Analytics Module

This module receives images from the image capturing device 110 and performs certain analysis on the images receives. For each test specimen, the module has to first perform an initialisation process to determine the reference spot position. Thereafter, the next images received are analysed for this displacement of the spot position with respect to the reference spot position to determine the strain value. Further details of the processes of this module will be described below with reference to FIG. 9.

The processes of this module may be performed as follows. The module receives one image of the wavefront of each laser beam after passing through the lenslet array. The image is binarized based on pre-defined threshold value. Bright spots which are the results of the laser wavefront focussing through the lenslet are located. Each of the spots, and their immediate vicinities are further analysed for their local high point more precisely using grayscale centroid computation. Each spot is then identified within which cell of the matrix, and the spot deviation from the reference spot position is then computed. The image caused by the illuminator on the X axis provides the u field while the illuminator on the Y axis provides the v field. With images from both u and v fields, the spot deviations are converted to in-plane normal and shear strains information using the following relationships:

Illuminator on the X Axis:

Normal strain information  Shear strain information $$\varepsilon_x = \frac{du}{dx} = \frac{\Delta x}{2f \sin\beta} \qquad \Delta\theta_1 = \frac{du}{dy} = \frac{\Delta y}{2f \sin\beta}$$

Illuminator on the y Axis:

Normal strain information $$\varepsilon_y = \frac{dv}{dy} = \frac{\Delta y}{2f \sin\beta}$$

Shear strain information $$\Delta\theta_2 = \frac{dv}{dx} = \frac{\Delta x}{2f \sin\beta}$$

where Δx and Δy are the x and y displacements of the spots as detected by the image capturing device when the specimen being loaded.

Total shear strain is given by $$\varepsilon_{xy} = \frac{1}{2}(\Delta\theta_1 + \Delta\theta_2)$$

Dynamic Lenslet Pattern Generation Module

Specific strain measurement applications require specific design of Diffractive Optical Element (DOE) patterns as lenslet array. It is difficult for the end user to define the appropriate lenslet pattern as it requires in-depth knowledge of optics, the SLM and interferometer. This process is error-prone and tedious as it is highly manual and requires an iterative process of selecting appropriate pattern array and noise filtering (based on visual interpretation). This module automates this process to configure, create and optimise the desired lenslet pattern to suit application-specific measurement requirements (such as measurement area and distribution resolution) as defined by the user, without requiring an overhaul or re-design of the hardware and software involved.

The processes of this module may be performed as follows. If the module receives strain resolution and range requirement, the module computes the SLM lenslet focal length and the array size based on the information received. If the module receives information that high-order diffraction interference is too strong, the module re-compute new lenslet size and array size to reduce crosstalk. Each lenslet is encoded by the approximate Fresnel lens phase function:

$$\phi(r) \approx 2\pi(a_2 r^2)$$

where $$a_2 = \frac{1}{2f\lambda}$$

r is the radial coordinate
f is the focal length, and
λ is the laser wavelength

The spacing, s, between the lenslets as generated is given by:

$$s = \frac{f\lambda}{p}$$

Where p is pixel size of SLM 120.
The strain measurement is computed from the spot displacement:

$$\varepsilon_x = \frac{du}{dx} = \frac{\Delta x}{2f\sin\beta} = \frac{P}{2f\lambda}\Delta x$$

$$\varepsilon_y = \frac{du}{dy} = \frac{\Delta y}{2f\sin\beta} = \frac{P}{2f\lambda}\Delta y$$

Where P is the grating pitch.
The range of strain measurement is limited to the maximum spot deflection within its own lenslet boundary. Hence $$\text{range} = \frac{P}{2f\lambda} \times s = \frac{P}{2p}$$

The strain resolution is dependent on the smallest spatial displacement the imaging system is able to detect. It is determined by the pixel size of the image capturing device.

$$\varepsilon_{res} = \frac{P}{2f\lambda} \times \text{camera pixel size}$$

The strain resolution can further be reduced if the image analytics module 420 is able to resolve the precise sub-pixel position of the spots.

Given the lenslet spacing, s, the number of measurement points achievable is the number of lenslets that can be laid over the SLM area or the field-of-view of the specimen under test, whichever is smaller.

The above formulae are optimized where the crosstalk from higher order deflected spots coincides with the $1^{st}$ order spots. As such the spots contrast is enhanced and it simplifies the task of detecting and measuring the spots positions without affecting the readings. Also, from the formulae, it can be seen that the strain resolution is directly related to the lenslet focal length, while the range and the rest of variables are fixed with the system hardware and specimen used. Given the strain measurement range defined by the system, the user only needs to specify the strain resolution requirement to obtain the lenslet focal length.

In the case where the user requires a wider strain measurement range, the lenslets are needed to be spaced further apart to allow for a wider deflection of the spots, where $$s > \text{required range} \times \frac{2f\lambda}{P}$$

This is suboptimal condition, as the higher order spots drift away from the $1^{st}$ order spots and interferes with the detection of the $1^{st}$ order spots on the image taken from the image capturing device. As the higher order spots are lower in intensities as compared to the $1^{st}$ order spots, and that intensities of the $1^{st}$ order spots are lower than that of the optimal, the exposure time in capturing the image is gradually adjusted (increased) during the initialization stage until the higher order spots are totally suppressed.

To prevent the higher order spots from converging into spots which have intensities indistinguishable from the $1^{st}$ order spots, the lenslet spacing shall NOT be near to $$s = \frac{f\lambda}{np}$$

where n=2, 3, 4 . . . .
The average (i.e. the mid-point) of the two adjacent values, while satisfying the strain measurement range, is selected as the lenslet spacing.

Image Optimisation Module

Microelectronic devices are fabricated with different packaging materials and may present different reflectance and diffraction properties. Typical optical measurement systems beaming out illumination of fixed intensity to capture one field at one time will produce inconsistent optical signals. Moreover, normal and shear strains can only be measured by manually switching the optics one at a time, thus generating u and v fields individually. Laser sources are required to operate at constant current to ensure consistent intensity and stability. This module provides adaptive control of image capturing device ensuring optimum image quality for the diverse types of materials used in different devices without human intervention. This is achieved by stepping up/down the exposure time of the image capturing device during initialization sequence before the start of measurement. The image captured is first captured at a low exposure and then binarized based on a pre-set threshold value. The resultant bright spots of pre-defined pixel size range are collated and sorted into an array of dots. The horizontal and vertical pitches of the matrix, as well as the density of the cluster of spots are computed and compared to the lenslet spacing. If there are too few spots, the image capture exposure is increased one step. The sequence repeats until the pitch of the dots detected matches with the lenslets spacing and that there are sufficient cluster of spots. The locations of the spots are registered as reference. This calibration process is repeated similarly for the other u, v fields as required.

Operation and Control Module

This module controls the information flow from various modules and generates the necessary information to be transmitted to the optical system.

Figure 5:
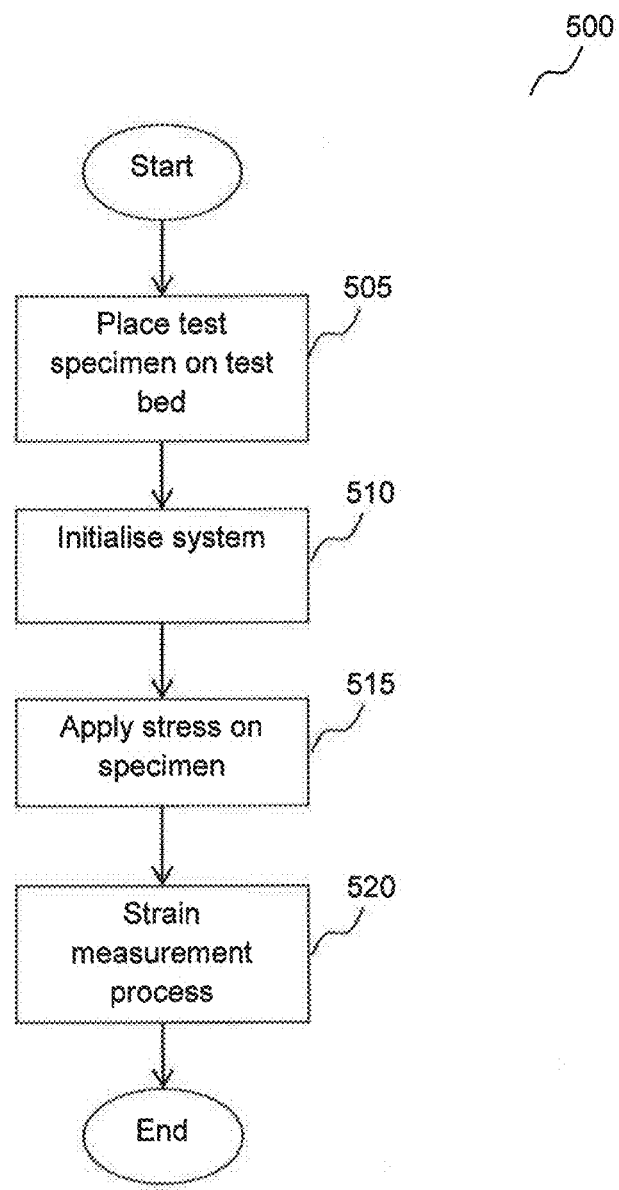
FIG. 5 illustrating a flow diagram of a process in accordance with an embodiment of this invention.

FIG. 5 illustrates a flow diagram of a process 500 for measuring strain on a test specimen. Process 500 beings with step 505 with placing the test specimen on the test bed. At this juncture, stress is not exerted to the test specimen. In step 510, the system is triggered and operation and control module performs an initialisation process to determine the reference spot position. Further details of the initialisation process will be described below with reference to FIG. 6.

After the system is initialised, process 500 proceeds with step 515 to exert stress on the specimen. Various stress such as compression, tension or shear stress may be exerted on the specimen. One skilled in the art will recognise that other forms of test such as thermal may also be implemented without departing from the invention. In step 520, the system will trigger the operation and control module to perform a strain measurement process. Further details of the performing a strain measurement process will be described below with reference to FIG. 10. Process 500 ends after step 520.

Figure 6:
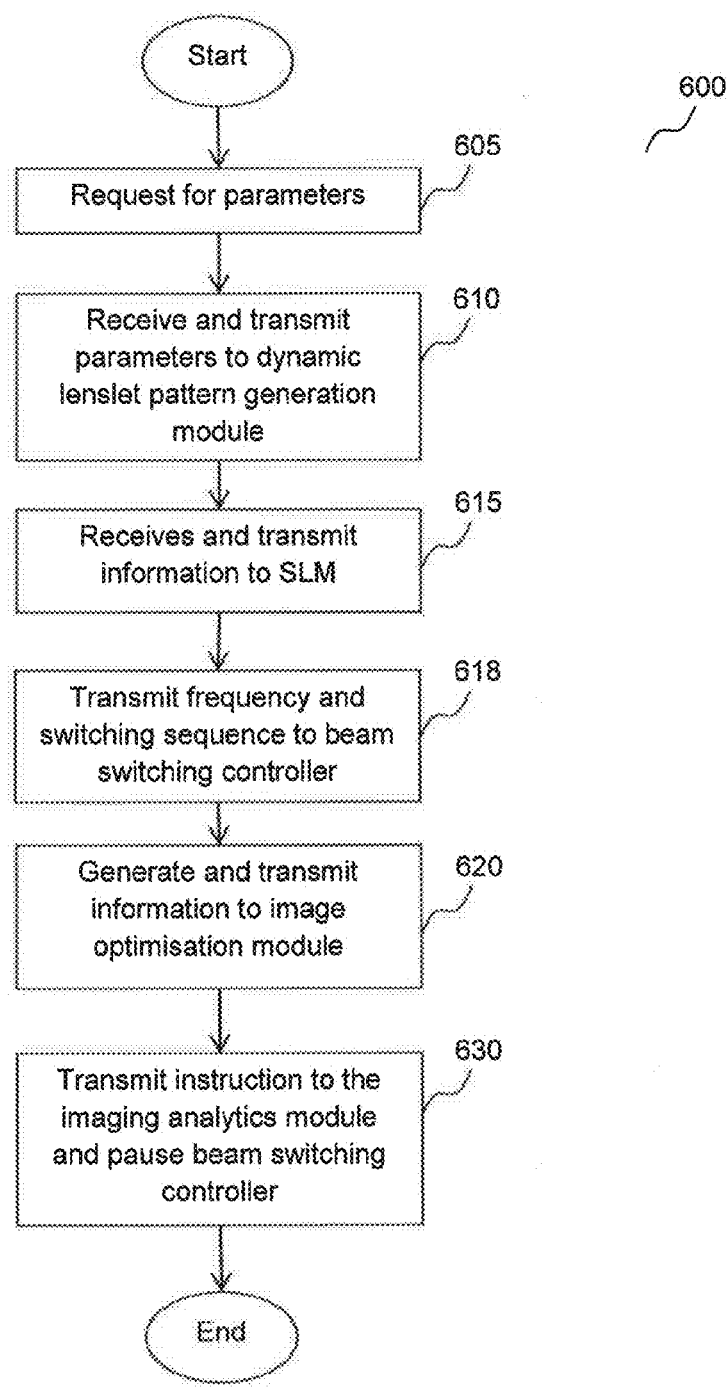
FIG. 6 illustrating a flow diagram of an initializing process in accordance with an embodiment of this invention.

FIG. 6 illustrates a flow diagram of process 600 performed by processing unit 150 in accordance with an embodiment of this invention. Process 600 is a flow diagram performed by the operation and control module 450 to initialise the system. Process 600 begins with step 605 by requesting the user to input parameters required. The parameters required are strain resolution and strain measurement range. Upon receiving the parameters from the user, operation and control module transmits the parameters to the dynamic lenslet pattern generation module in step 610 to generate a lenslet pattern. Further details of the generating the lenslet pattern will be described below.

In step 615, operation and control module receives the information from the lenslet pattern generation module and transmit the information to the SLM. The information received from the lenslet pattern generation module is a gray-scale image of the lenslet pattern to be rendered on the SLM. Based on this gray-scale image, the SLM generates the lenslet pattern accordingly.

In step 618, process 600 determines the frequency and switching sequence information for controlling the beam switching controller and subsequently generates the required signal to activate the beam switching controller to alternate the light sources 130 and the trigger signal to activate the image capturing device 110 to capture images. The frequency and switching sequence information may be pre-determined and stored in the memory of the system. Alternatively, the frequency and switching sequence may be entered by the user without departing from the invention. When the light sources 130 are activated, a beam from the first light sources 130 is directed towards the test specimen 180. The diffracted wavefront from the test specimen 180 passes through the SLM and converges onto the image capturing device according the lenslet pattern formed on the SLM. The image capturing device will capture the image and transmit the image caused by the first light source to the processing unit. This process is repeated for the light source 130 to produce another image caused by the second light source to the processing unit.

In step 620, operation and control module generates and transmits lenslet spacing to the image optimisation module to determine exposure time of the image capturing device and reference spot position. Further details of determining the exposure time will be described below with reference to FIG. 8.

In step 630, operation and control module transmits instructions to activate imaging analytics module which will in turn display images on display 240. Concurrently, operation and control module transmits a signal to pause the beam switching controller. This extends the lifespan of the beam switching controller. One skilled in the art will recognise that instead of pausing the beam switching controller, the process may be modified to automatically determine whether the strain has been applied to the specimen by analysing the first and second images without departing from the invention. Process 600 ends after step 630.

Figure 7:
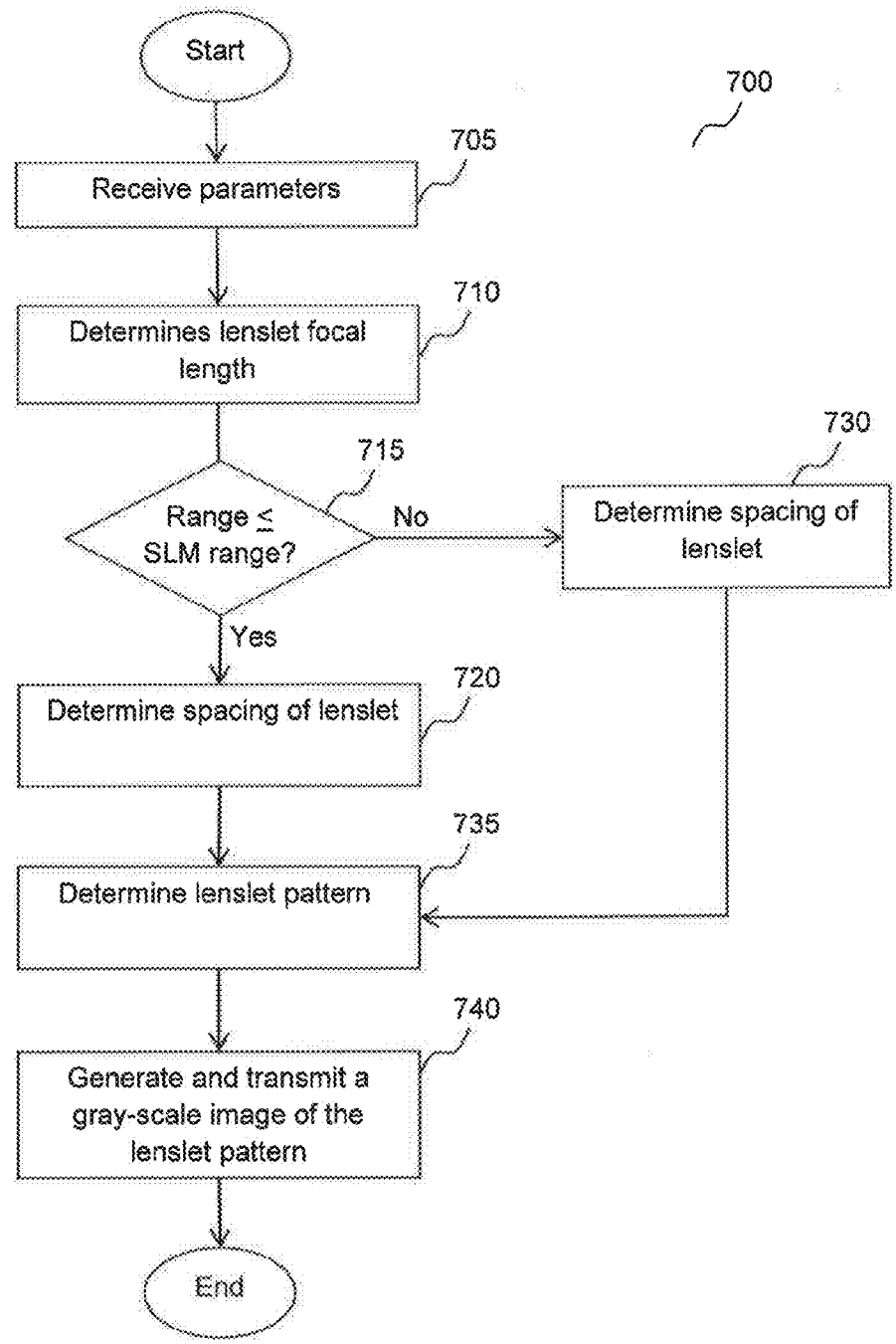
FIG. 7 illustrating a flow diagram of a process performed by a dynamic lenslet pattern generation module in accordance with an embodiment of this invention.

FIG. 7 illustrates a flow diagram of process 700 performed by processing unit 150 in accordance with an embodiment of this invention. Process 700 is a flow diagram performed by the dynamic lenslet pattern generation module. Process 700 begins with step 705 by receiving a parameter from the operation and control module.

In step 710, process 700 determines the lenslet focal length, f, using strain resolution with the following expression, $$\varepsilon_{res} = \frac{P}{2f\lambda} \times \text{camera pixel size}$$

Which can also be written as, $$f = \frac{P}{2\lambda\varepsilon_{res}} \times \text{camera pixel size}$$

The camera pixel size is dependent on the camera used. This can be obtained from the specification of the camera, i.e. image capturing device. Hence, the camera pixel size is fixed. Grating pitch, P, is obtained using the expression, $$P = \frac{\lambda}{\sin\beta}$$

Where β is the angle between the incident direction of the laser beam and the normal of the specimen surface. This is pre-determined since the light sources are fixed at a certain elevation. λ is the wavelength of the laser source and this is pre-determined.

In step 715, process 700 determines if the strain measurement range is within a required range. The required range is determined by the following expression, $$\text{range} = \frac{P}{2f\lambda} \times s = \frac{P}{2p}$$

This is when higher order spots coincide with $1^{st}$ order spots. As shown in the above expression, the range is dependent on the camera and SLM specification, namely camera pixel size and pixel size of SLM 120. The image captured will be much clearer, easier to process and possibly more accurate as a result. Any measurements beyond the required range will result in images with higher order spots appearing between the $1^{st}$ order spots which make image processing more difficult. This may affect the accuracy of the readings or introduce errors, but measurement is still possible. Theoretically, the maximum system range is determined by the smaller of the camera sensor size or pixel size of SLM. When only one lens is used to produce only one spot, the maximum the spot could sweep is within this area. If the strain measurement range is within the required range, process 700 proceeds to step 720. Otherwise, process 700 proceeds to step 730.

In step 720, the spacing, s, between the lenslet is determined with the following expression, $$s = \frac{f\lambda}{p}$$

Where p is the pixel size of the SLM which is dependent on the type of SLM being used. After step 720, process 700 proceeds to step 735.

In step 730, the lenslet spacing, s, is determined with the following expressions, $$s > \text{required range} \times \frac{2f\lambda}{P} \text{ and } s = \frac{(2n+1)f\lambda}{n(n+1)p}$$

where n=1, 2, 3 . . . .

In step 735, process 700 determines the lenslet pattern with the following expression, $$\phi(r) \approx 2\pi(a_2 r^2)$$

In step 740, process 700 generates and transmits a grayscale image of the lenslet pattern based on the radial coordinate determined in step 735 and the spacing, s, determined in step 720 or step 730. Process 700 ends after step 740.

Figure 8:
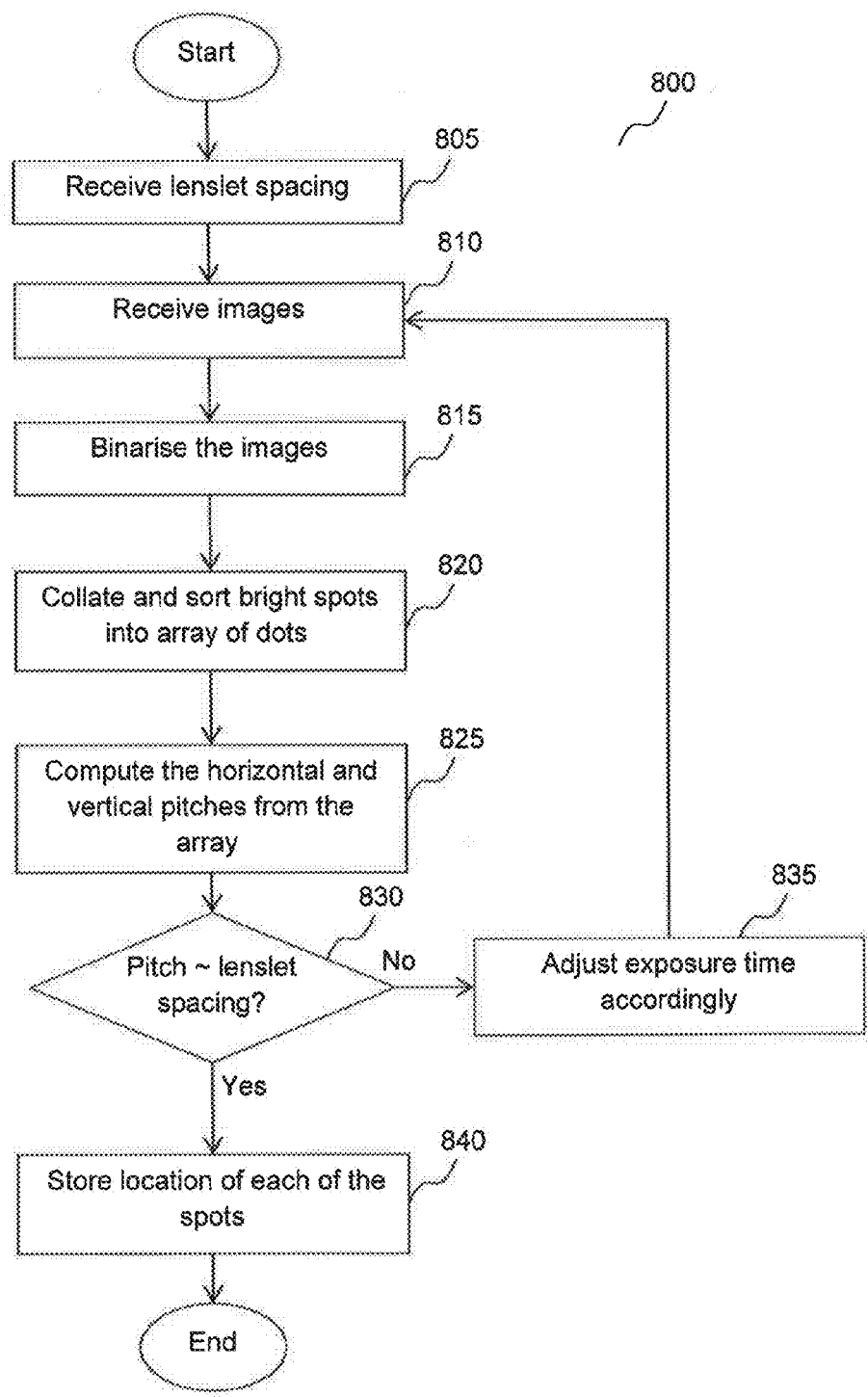
FIG. 8 illustrating a flow diagram of a process performed by an image optimization module in accordance with an embodiment of this invention.

FIG. 8 illustrates a flow diagram of process 800 performed by processing unit 150 in accordance with an embodiment of this invention. Process 800 is a flow diagram performed by the imaging optimisation module. Process 800 begins with step 805 by receiving the lenslet spacing. In step 810, process 800 receives 2 images, namely, 1) V field and 2) U field.

In step 815, process 800 binarises the images based on a pre-determined threshold value. It is found that a threshold value of 254 typically provides good results. However, one skilled in the art will recognise that other pre-determined threshold value may be used without departing from the invention.

In step 820, process 800 collates and sorts the resultant bright spots of pre-defined pixel size range into an array of dots. The horizontal and vertical pitches of the matrix, as well as the density of the cluster of spots are computed in step 825.

The horizontal and vertical pitches are then compared to the lenslet spacing in step 830. If the pitch is smaller or greater than the lenslets spacing by a per-defined threshold value, process 800 proceeds to step 835. If the pitch is within the lenslets spacing by a per-defined threshold value, process 800 proceeds to step 840.

In step 835, process 800 adjusts the exposure time of the image capturing device accordingly. In particular, if the pitch is smaller than the lenslets spacing by the per-defined threshold value, implying too many spots, the image may be too bright and has too much background noise. Hence the image optimisation module reduces exposure time of the image capturing device. If the pitch is larger than the lenslets spacing by the pre-defined threshold value, implying too little spots, the image may be too dim. Hence the image optimisation module increases the exposure time of the image capturing device. After step 835, process 800 repeats from step 810 to receive the next images from the image capturing device based on the adjusted exposure time.

Figure 10:
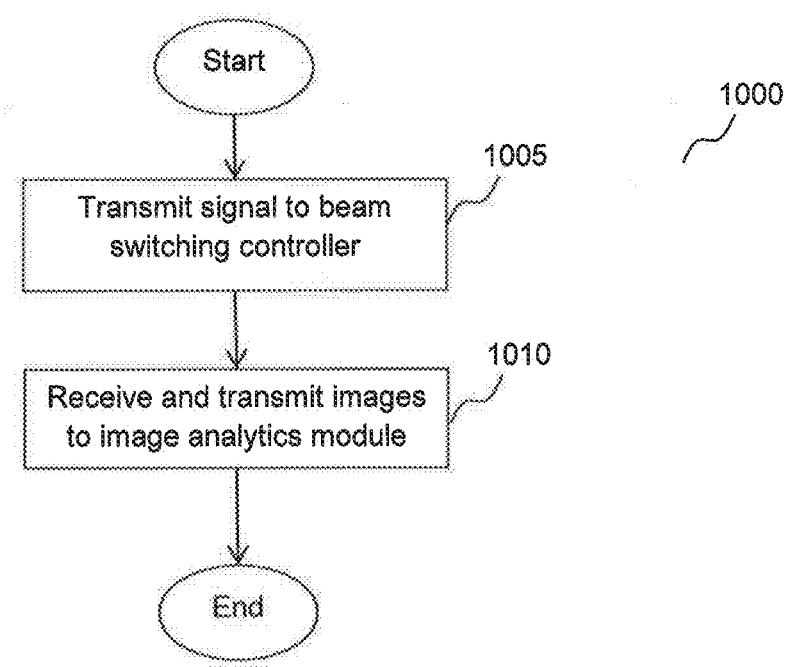
FIG. 10 illustrating a flow diagram of a stress measurement process in accordance with an embodiment of this invention.

In step 840, process 800 stores the location of each of the spots as reference positions for each of the V field and U field in the memory of the system. One skilled in the art will recognise a certain small percentage of missing spots may be allowed to cater for some minor defects on the grating on the specimen. Hence, step 830 may include a further step to ensure that the total number of spots is at least above a certain threshold. The certain threshold may be certain percentage of the expected number of grid boxes. Process 800 ends after step 840. FIG. 10 shows the 70 grid boxes where each of the grid boxes includes only one reference spot.

Figure 9:
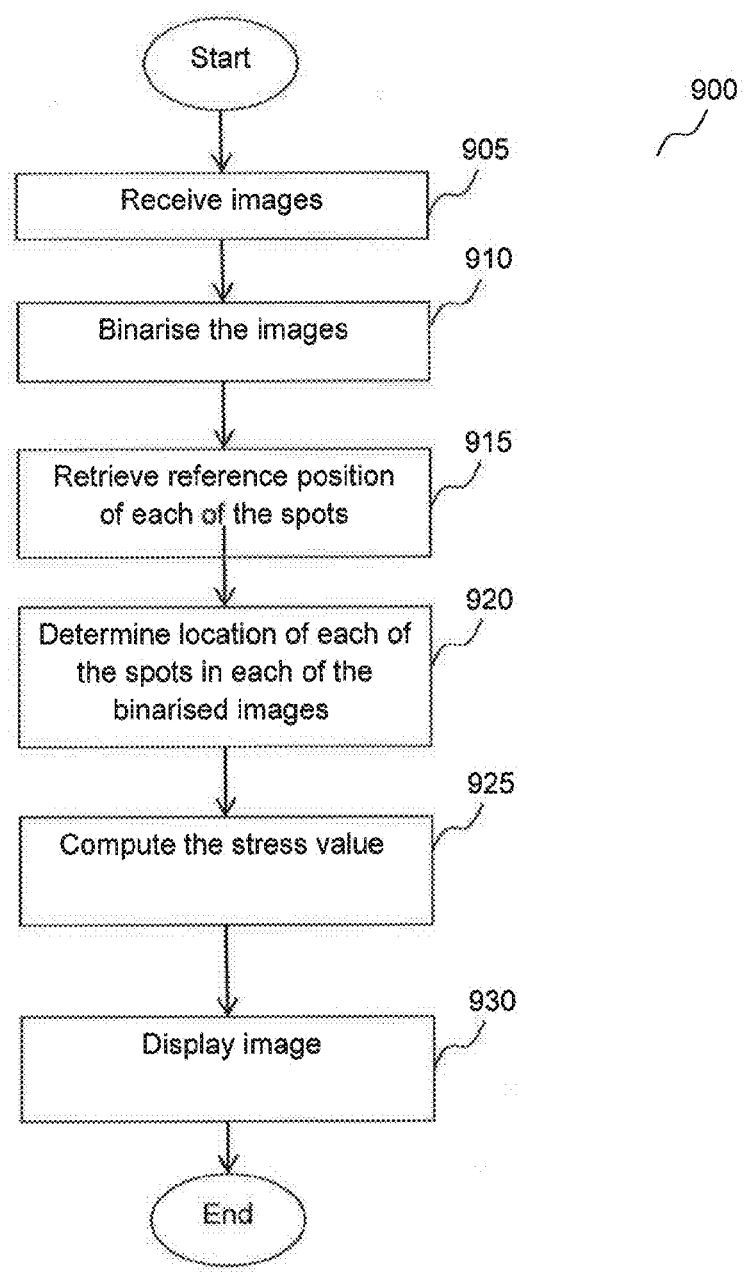
FIG. 9 illustrating a flow diagram of a process performed by an imaging analytics module in accordance with an embodiment of this invention.

FIG. 9 illustrates a flow diagram of process 900 performed by processing unit 150 in accordance with an embodiment of this invention. Process 900 is a flow diagram performed by the imaging analytics module. Process 900 begins with step 905 by receiving 2 images, namely, 1) V field and 2) U field. In step 910, process 900 binarises the images based on a pre-determined threshold value. It is found that a threshold value of 254 typically provides good results. However, one skilled in the art will recognise that other pre-determined threshold value may be used without departing from the invention.

In step 915, process 900 retrieves the reference position of each of the spots for each of the V field and U field from the memory. In step 920, process 900 determines the location of each of the bright spots for V field and U field images.

In step 925, process 900 computes the normal and shear strain value based on the x and y displacements of the spots, i.e. difference between the location of the bright spot and the reference position. During initialisation process, the displacement would be zero since stress has not been applied to the specimen. However, during the strain measurement process, the bright spots determined in the subsequent first and second images would likely be displaced from the reference positions. The normal strain value for each of the bright spots for each of the first and second images is determined with the following expressions, For first image:

$$\varepsilon_x = \frac{du}{dx} = \frac{\Delta x}{2f \sin\beta} = \frac{P}{2f\lambda}\Delta x$$

For second image $$\varepsilon_y = \frac{dv}{dy} = \frac{\Delta y}{2f \sin\beta} = \frac{P}{2f\lambda}\Delta y$$

where $\Delta x$ and $\Delta y$ are the x and y displacements of the reference position for each of the bright spots in each of the U and V field images. The shear strain value is then determined with the following expressions, $$\Delta\theta_1 = \frac{du}{dy} = \frac{\Delta y}{2f\sin\beta}$$

$$\Delta\theta_2 = \frac{dv}{dx} = \frac{\Delta x}{2f\sin\beta}$$

$$\varepsilon_{xy} = \frac{1}{2}(\Delta\theta_1 + \Delta\theta_2)$$

Normal strain measures changes in length along a specific direction while shear strain measures changes in angles with respect to two specific directions.

In step 930, process 900 displays the U and V field images with the normal and shear strain values for each of the bright spots on display 240. Particularly, three strain values, namely normal strain from the x axis, $\epsilon_x$, normal strain from the y axis, $\epsilon_y$, and total shear strain $\epsilon_{xy}$ are presented. Further, either one of the U or V field image is selected to display with the normal and shear strain value for each of the bright spots. The normal and shear strain values may be presented in a table format or alternatively indicated next to the respective bright spot. The grid lines, centre location and strain reading at each spot can be rendered onto the image as and when the user desires. During display of the images on the display 240, the operation and control module may receive an input from the user to display the images in 3D and in turn, the image analytic module will transmit the relevant information to the 3D analytics module to translate the information into 3 dimensional plane and display the 3D image on the display 240. The 3D display may be obtained via a 3D rendering library, which can also perform shading, colour palette to highlight high stress areas. Process 900 ends after 930.

FIG. 10 illustrates a flow diagram of process 1000 performed by processing unit 150 in accordance with an embodiment of this invention. Process 900 is a flow diagram performed by the operation and control module to begin stress measurement. Process 1000 begins with step 1005 by transmitting a signal to the beam switching controller to continue.

In step 1010, operation and control module receives subsequent images from the image capturing device and transmits the subsequent images to the image analytics module. The image analytics module will determine the shear strain value and display the subsequent images to the display 240. The measurement can run as long as the test requires. The user can set the duration of the test, and can stop any time. Testing may be conducted with static/dynamic mechanical load, thermal cycling (if specimen is place in thermal chamber), electrical test, etc. Process 1000 ends after step 1010.

During stress measurement process, the imaging analytics module will attempt to process the images in concurrent with the frequency of the image captured by the image capturing device. If the imaging analytics module is unable to cope with the processing speed, the imaging analytics module may skip the next set of images and resumes with subsequent images.

Figure 11:
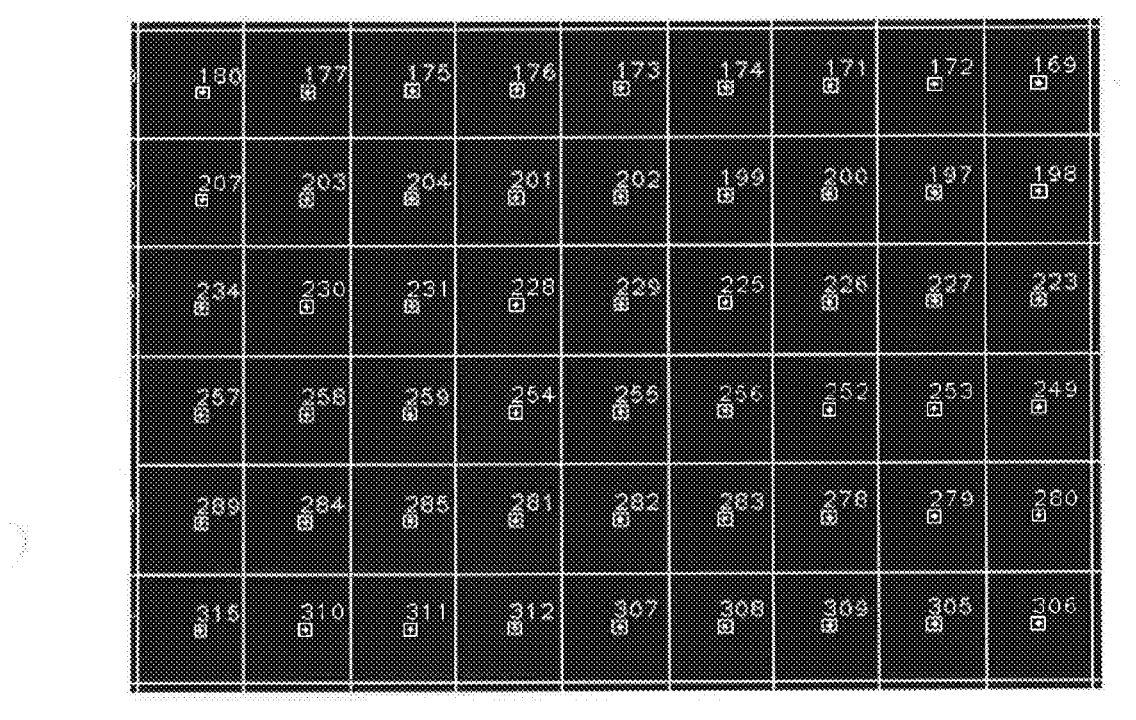

FIG. 11 illustrates an image of a test specimen after initialisation process. As shown, the boundary of the matrix and the reference spots are being established. A reference number is provided against each of the reference spots for identification purpose.

Figure 12:
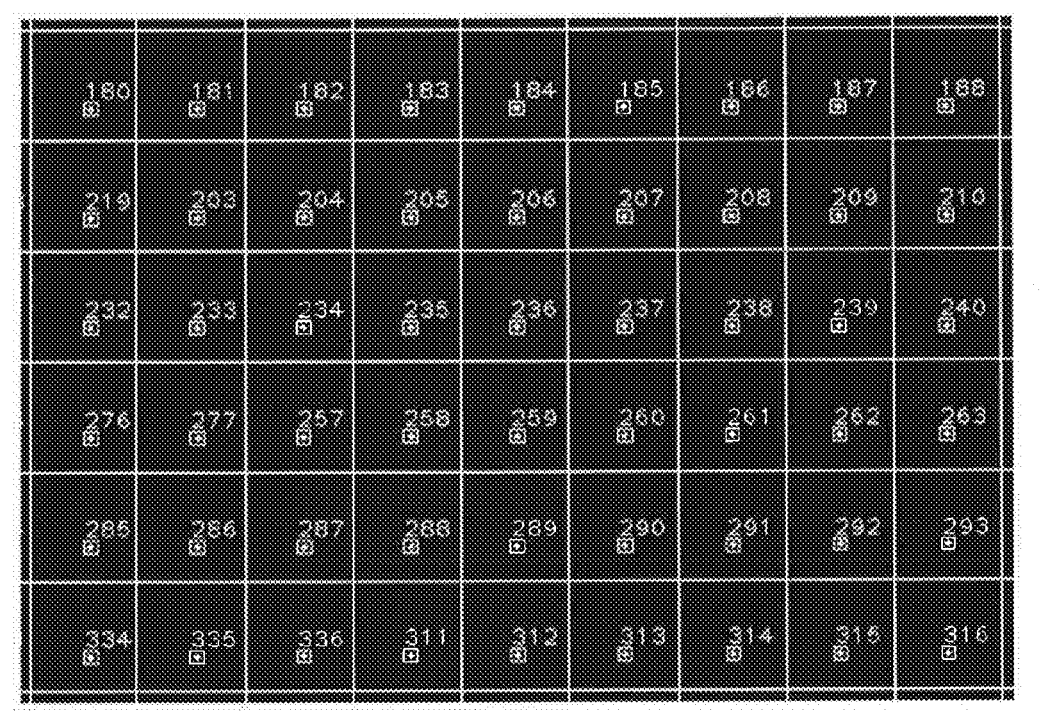
Figure 13:
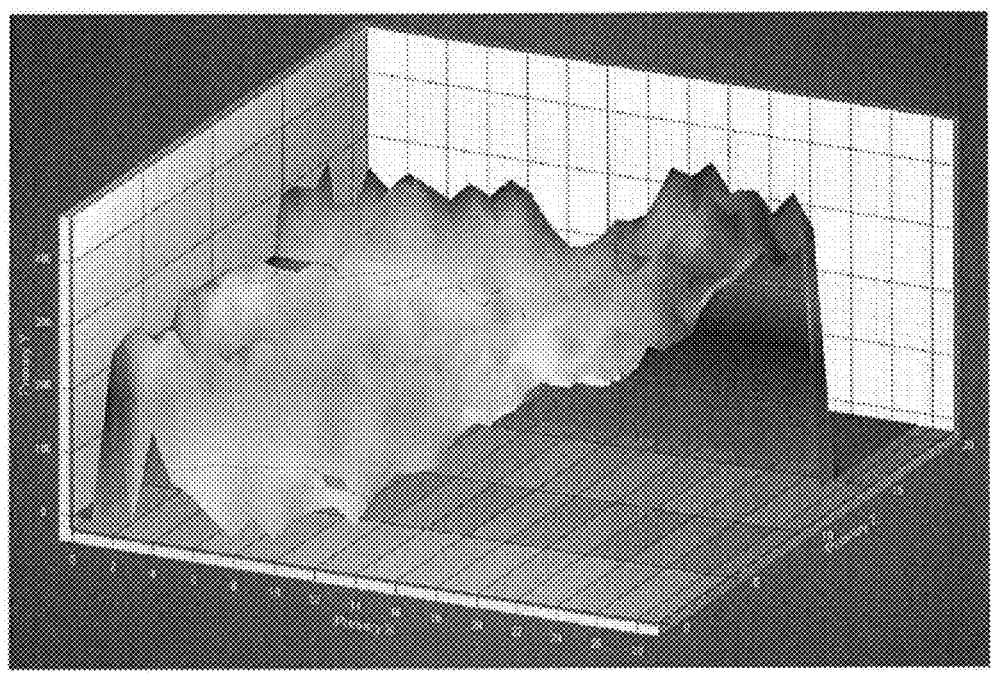
FIG. 13 illustrating an example of the result of the specimen during the stress measurement process in 3 dimensions.

FIG. 12 illustrates an image of a test specimen under stress. FIG. 13 illustrates a 3D image of the results as shown in FIG. 12. As shown, the bright spots shifted within their boundary when the specimen is being stressed. In particular, there is a general shift in x- and y-direction. A reference number is also provided against each of the bright spots for identification purpose. The reference number of the bright spots may or may not be identical to the reference number of the reference spots as the reference numbers are for identification purpose for each of the images. Nevertheless, one skilled in the art will recognise that the reference number for the reference spots and the bright spots may be configured to be identical for easy reference without departing from the invention. Further, the normal and shear strain values may be included against easy of the bright spots for easy reference as well.

Although the above description mentioned the use of only two light sources, one skilled in the art will recognise that four light sources may be implemented without departing from the invention.

The above is a description of exemplary embodiments of a strain measurement system in accordance with this invention. It is foreseeable that those skilled in the art can and will design alternative systems based on this disclosure that infringe upon this invention as set forth in the following claims.

The invention claimed is:

1. A method for measuring strain of a specimen on a strain measurement system having an image capturing device, a spatial light modulator, a first light source, a second light source, a beam switching controller, and a processing system, the method comprising:
   receiving parameters from a user;
   generating a lenslet pattern based on the parameters received;
   transmitting said lenslet pattern to said spatial light modulator;
   transmitting a frequency and switching sequence to said beam switching controller to alternate said first and second light sources and activate said image capturing device to capture images;
   receiving a first image captured by said image capturing device caused by a beam of said first light source and a second image captured by said image capturing device caused by a beam of said second light source;
   optimising said image capturing device based on said second and first images received;
   displaying said second image and first image on a display in response to said image capturing device being optimised;
   transmitting a signal to said beam switching controller to temporarily stop alternating said first and second light sources and activating said image capturing device;
   receiving an input from said user to begin stress measurement;
   transmitting a signal to said beam switching controller to continue alternating said first and second light sources and activating said image capturing device to capture images;
   receiving a subsequent first image captured by said image capturing device caused by a beam of said first light source and a subsequent second image captured by said image capturing device caused by a beam of said second light source; and
   displaying said second image and first image on the display.

2. The method according to claim 1, wherein said parameters from said user comprise a strain resolution and a strain measurement range.

3. The method according to claim 2, wherein said step of generating said lenslet pattern comprises:
   determining a lenslet spacing, s;
   determining a radial coordinate;
   generating said lenslet pattern based on said lenslet spacing and said radial coordinate; and
   generating a gray-scale image based on said lenslet pattern generated.

4. The method according to claim 3, further comprising:
   retrieving an angle, β, between an incident direction of said first or second light source and a norm of a surface of the specimen from a media of said processing system;
   retrieving, from said media, a wavelength, λ, of said first or second light source;
   determining a grating pitch, P, with the following expression, $$P = \frac{\lambda}{\sin\beta};$$

retrieving, from said media, a pixel size of said image capturing device; and
   determining a lenslet focal length, f, using said strain resolution, $\epsilon_{res}$, with the following expression, $$f = \frac{P}{2\lambda\epsilon_{res}} \times \text{pixel size}.$$

5. The method according to claim 4, wherein said step of determining said lenslet spacing, s, comprises:
   retrieving, from said media, an operating range of said spatial light modulator;
   comparing said strain measurement range with said operating range;
   determining said lenslet spacing, s, if said strain measurement range is less than or equal to said operating range, with the following expression, $$s = \frac{f\lambda}{p};$$

and
   determining said lenslet spacing, s, if said strain measurement range is greater than said operating range, with the following expressions, $$s > \text{required range} \times \frac{2f\lambda}{P}$$

and $$s = \frac{(2n+1)f\lambda}{n(n+1)p},$$

where n=1, 2, 3 ....

6. The method according to claim 5, wherein said step of determining said radial coordinate comprises:
determining said radial coordinate, φ(r), with the following expression, $\phi(r) \approx 2\pi(a_2 r^2)$ where $$a_2 = \frac{1}{2f\lambda}.$$

7. The method according to claim 6, wherein said step of optimising said image capturing device based on said second and first images received comprises:
   making binary said second and first images;
   collating and sorting bright spots in said second and first images that are above a pre-defined pixel size into an array of dots to form a matrix;
   determining horizontal and vertical pitches of said matrix;
   comparing said horizontal and vertical pitches with said lenslet spacing;
   increasing an exposure time of said image capturing device if one of said horizontal and vertical pitches is smaller than said lenslet spacing by a pre-defined threshold value;
   decreasing said exposure time of said image capturing device if one of said horizontal and vertical pitches is greater than said lenslet spacing by said pre-defined threshold value; and
   storing a location of each of said bright spots as reference positions for each of said first and second images in said media if each of said horizontal and vertical pitches is within said lenslet spacing by said pre-defined threshold value.

8. The method according to claim 7, wherein said step of displaying said second image and first image on said display comprises:
   determining locations of each of said bright spots;
   computing a first normal strain value, $\epsilon_x$, for each of said bright spots in said first image with the following expression, $$\epsilon_x = \frac{du}{dx} = \frac{\Delta x}{2f\sin\beta} = \frac{P}{2f\lambda}\Delta x,$$

where Δx is an x displacement of said reference positions for each of said bright spots in said first image;
   computing a second normal strain value, $\epsilon_y$, for each of said bright spots in said second image with the following expression, $$\epsilon_y = \frac{dv}{dy} = \frac{\Delta y}{2f\sin\beta} = \frac{P}{2f\lambda}\Delta y,$$

where Δy is a y displacement of said reference positions for each of said bright spots in said second image;
   computing a shear strain value, $\epsilon_{xy}$, for each of said bright spots with the following expression, $$\epsilon_{xy} = \frac{1}{2}(\Delta\theta_1 + \Delta\theta_2)$$

where $$\Delta\theta_1 = \frac{du}{dy} = \frac{\Delta y}{2f\sin\beta},$$

-continued $$\Delta\theta_2 = \frac{dv}{dx} = \frac{\Delta x}{2f\sin\beta},$$

$\Delta x$ and $\Delta y$ are the x and y displacements of said reference positions for each of said bright spots in each of said first and second images; and displaying said first and second images with said first normal strain value, said second normal strain value and said shear strain value for each of said bright spots.

9. A processing system for measuring strain of a specimen on a strain measurement system having an image capturing device, a spatial light modulator, a first light source, a second light source and a beam switching controller, the processing system comprising:

an operation and control module;
an image optimisation module;
a dynamic lenslet pattern generation module; and
an image analytics module,
wherein said operation and control module is configured to perform the following steps in response to an initialisation process:
  receiving parameters from a user;
  transmitting said parameters to said dynamic lenslet pattern generation module;
  receiving a lenslet pattern generated by said dynamic pattern generation module;
  transmitting said lenslet pattern to said spatial light modulator;
  transmitting a frequency and switching sequence to said beam switching controller to alternate said first and second light sources and activate said image capturing device to capture images;
  receiving a first image captured by said image capturing device caused by a beam of said first light source and a second image captured by said image capturing device caused by a beam of said second light source;
  transmitting said first image and second image to said image optimisation module for optimising said image capturing device based on said second and first images received in response to said image capturing device being optimised;
  transmitting said first image and second image to said image analytics module for displaying said first image and second image on a display;
  transmitting a signal to said beam switching controller to temporarily stop alternating said first and second light sources and activating said image capturing device;
  receiving an input from said user to begin stress measurement;
  transmitting a signal to said beam switching controller to continue alternating said first and second light sources and activating said image capturing device to capture images;
  receiving a subsequent first image captured by said image capturing device caused by a beam of said first light source and a subsequent second image captured by said image capturing device caused by a beam of said second light source; and
  transmitting said subsequent first image and second image to said image analytics module for displaying said second image and first image on said display.

10. The processing system according to claim 9, wherein said parameters from said user comprise a strain resolution and a strain measurement range.

11. The processing system according to claim 10, wherein said dynamic lenslet pattern generation module performs the following steps in response to receiving said parameters from said operation and control module:
  determining a lenslet spacing, s;
  determining a radial coordinate;
  generating said lenslet pattern based on said lenslet spacing and said radial coordinate;
  generating a gray-scale image based on said lenslet pattern generated; and
  transmitting said gray-scale image to said operation and control module.

12. The processing system according to claim 11, wherein said dynamic lenslet pattern generation module performs the following steps in response to receiving said parameters from said operation and control module:
  retrieving, from a media of said processing system, an angle, $\beta$, between an incident direction of said first or second light source and a norm of a surface of the specimen;
  retrieving, from said media, a wavelength, $\lambda$, of said first or second light source;
  determining a grating pitch, P, with the following expression, $$P = \frac{\lambda}{\sin\beta};$$

retrieving, from said media, a pixel size of said image capturing device; and
  determining a lenslet focal length, f, using said strain resolution, $\epsilon_{res}$, with the following expression, $$f = \frac{P}{2\lambda\varepsilon_{res}} \times \text{pixel size}.$$

13. The processing system according to claim 12, wherein said step of determining said lenslet spacing, s, comprises:
  retrieving, from said media, an operating range of said spatial light modulator;
  comparing said strain measurement range with said operating range;
  determining said lenslet spacing, s, if said strain measurement range is less than or equal to said operating range, with the following expression, $$s = \frac{f\lambda}{p};$$

and
  determining said lenslet spacing, s, if said strain measurement range is greater than said operating range, with the following expressions, $$s > \text{required range} \times \frac{2f\lambda}{P}$$

and

-continued $$s = \frac{(2n+1)f\lambda}{n(n+1)p},$$

where n=1, 2, 3 . . . .

14. The processing system according to claim 13, wherein said step of determining said radial coordinate comprises:
determining said radial coordinate, $\phi(r)$, with the following expression, $\phi(r) \approx 2\pi(a_2 r^2)$ where $$a_2 = \frac{1}{2f\lambda}.$$

15. The processing system according to claim 14, wherein said image optimisation module performs the following steps in response to receiving said first image and second image:
making binary said second and first images;
collating and sorting bright spots in said second and first images that are above a pre-defined pixel size into an array of dots to form a matrix;
determining horizontal and vertical pitches of said matrix;
comparing said horizontal and vertical pitches with said lenslet spacing;
increasing an exposure time of said image capturing device if one of said horizontal and vertical pitches is smaller than said lenslet spacing by a pre-defined threshold value;
decreasing said exposure time of said image capturing device if one of said horizontal and vertical pitches is greater than said lenslet spacing by said pre-defined threshold value; and
storing a location of each of said bright spots as reference positions for each of said first and second images in said media if each of said horizontal and vertical pitches is within said lenslet spacing by said pre-defined threshold value.

16. The processing system according to claim 15, wherein said image analytics module performs the following steps in response to receiving said first image and second image:
determining locations of each of said bright spots;
computing a first normal strain value, $\epsilon_x$, for each of said bright spots in said first image with the following expression, $$\varepsilon_x = \frac{du}{dx} = \frac{\Delta x}{2f\sin\beta} = \frac{P}{2f\lambda}\Delta x,$$

where $\Delta x$ is an x displacement of said reference positions for each of said bright spots in said first image;
computing a second normal strain value, $\epsilon_y$, for each of said bright spots in said second image with the following expression, $$\varepsilon_y = \frac{dv}{dy} = \frac{\Delta y}{2f\sin\beta} = \frac{P}{2f\lambda}\Delta y,$$

where $\Delta y$ is a y displacement of said reference positions for each of said bright spots in said second image;
computing a shear strain value, $\epsilon_{xy}$, for each of said bright spots with the following expression, $$\varepsilon_{xy} = \frac{1}{2}(\Delta\theta_1 + \Delta\theta_2)$$

where $$\Delta\theta_1 = \frac{du}{dy} = \frac{\Delta y}{2f\sin\beta},$$

$$\Delta\theta_2 = \frac{dv}{dx} = \frac{\Delta x}{2f\sin\beta},$$

$\Delta x$ and $\Delta y$ are the x and y displacements of said reference positions for each of said bright spots in each of said first and second images; and
displaying said first and second images with said first normal strain value, said second normal strain value and said shear strain value for each of said bright spots.

17. A processing system for measuring strain of a specimen on a strain measurement system having an image capturing device, a spatial light modulator, a first light source, a second light source and a beam switching controller, the processing system comprising:
a processor;
memory storing instructions that, when executed by said processor, cause the processing system to perform the following steps:
receiving parameters from a user;
generating a lenslet pattern based on the parameters received;
transmitting said lenslet pattern to said spatial light modulator;
transmitting a frequency and switching sequence to said beam switching controller to alternate said first and second light sources and activate said image capturing device to capture images;
receiving a first image captured by said image capturing device caused by a beam of said first light source and a second image captured by said image capturing device caused by a beam of said second light source;
optimising said image capturing device based on said second and first images received;
displaying said second image and first image on a display in response to said image capturing device being optimised;
transmitting a signal to said beam switching controller to temporarily stop alternating said first and second light sources and activating said image capturing device;
receiving an input from said user to begin stress measurement;
transmitting a signal to said beam switching controller to continue alternating said first and second light sources and activating said image capturing device to capture images;
receiving a subsequent first image captured by said image capturing device caused by a beam of said first light source and a subsequent second image captured by said image capturing device caused by a beam of said second light source; and
displaying said second image and first image on a display.

18. The processing system according to claim 17, wherein said parameters from said user comprise a strain resolution and a strain measurement range.

19. The processing system according to claim 18, wherein generating said lenslet pattern comprises:
   determining a lenslet spacing, s;
   determining a radial coordinate;
   generating said lenslet pattern based on said lenslet spacing and said radial coordinate; and
   generating a gray-scale image based on said lenslet pattern generated.

20. The processing system according to claim 19, wherein the memory stores instructions that, when executed by said processor, cause the processing system to perform the following steps:
   retrieving, from said memory, an angle, β, between an incident direction of said first or second light source and a norm of a surface of the specimen;
   retrieving, from said memory, a wavelength, λ, of said first or second light source;
   determining a grating pitch, P, with the following expression, $$P = \frac{\lambda}{\sin\beta};$$

retrieving, from said memory, a pixel size of said image capturing device; and
   determining a lenslet focal length, f, using said strain resolution, $\epsilon_{res}$, with the following expression, $$f = \frac{P}{2\lambda\varepsilon_{res}} \times \text{pixel size}.$$

21. The processing system according to claim 20, wherein determining said lenslet spacing, s, comprises:
   retrieving, from said memory, an operating range of said spatial light modulator;
   comparing said strain measurement range with said operating range;
   determining said lenslet spacing, s, if said strain measurement range is less than or equal to said operating range, with the following expression, $$S = \frac{f\lambda}{p};$$

and
   determining said lenslet spacing, s, if said strain measurement range is greater than said operating range, with the following expressions, $$s > \text{required range} \times \frac{2f\lambda}{P}$$

and $$s = \frac{(2n+1)f\lambda}{n(n+1)p},$$

where n=1, 2, 3 . . . .

22. The processing system according to claim 21, wherein determining said radial coordinate, φ(r), comprises:
   determining said radial coordinate with the following expression, $\phi(r) \approx 2\pi(a_2 r^2)$ where $$a_2 = \frac{1}{2f\lambda}.$$

23. The processing system according to claim 22, wherein optimising said image capturing device based on said second and first images received comprises:
   making binary said second and first images;
   collating and sorting bright spots in said second and first images that are above a pre-defined pixel size into an array of dots to form a matrix;
   determining horizontal and vertical pitches of said matrix;
   comparing said horizontal and vertical pitches with said lenslet spacing;
   increasing an exposure time of said image capturing device if one of said horizontal and vertical pitches is smaller than said lenslet spacing by a pre-defined threshold value;
   decreasing said exposure time of said image capturing device if one of said horizontal and vertical pitches is greater than said lenslet spacing by said pre-defined threshold value; and
   storing a location of each of said bright spots as reference positions for each of said first and second images in said memory if each of said horizontal and vertical pitches is within said lenslet spacing by said pre-defined threshold value.

24. The processing system according to claim 23, wherein displaying said second image and first image on said display comprises:
   determining locations of each of said bright spots;
   computing a first normal strain value, $\epsilon_x$, for each of said bright spots in said first image with the following expression, $$\varepsilon_x = \frac{du}{dx} = \frac{\Delta x}{2f\sin\beta} = \frac{P}{2f\lambda}\Delta x,$$

where Δx is an x displacement of said reference positions for each of said bright spots in said first image;
   computing a second normal strain value, $\epsilon_y$, for each of said bright spots in said second image with the following expression, $$\varepsilon_y = \frac{dv}{dy} = \frac{\Delta y}{2f\sin\beta} = \frac{P}{2f\lambda}\Delta y,$$

where Δy is a y displacement of said reference positions for each of said bright spots in said second image;
   computing a shear strain value, $\epsilon_{xy}$, for each of said bright spots with the following expression, $$\varepsilon_{xy} = \frac{1}{2}(\Delta\theta_1 + \Delta\theta_2)$$

where $$\Delta\theta_1 = \frac{du}{dy} = \frac{\Delta y}{2f\sin\beta},$$

-continued $$\Delta\theta_2 = \frac{dv}{dx} = \frac{\Delta x}{2f\sin\beta},$$

$\Delta x$ and $\Delta y$ are the x and y displacements of said reference positions for each of said bright spots in each of said first and second images; and displaying said first and second images with said first normal strain value, said second normal strain value and said shear strain value for each of said bright spots.

* * * * *